United States Patent [19]

Schartz

[11] Patent Number: 5,632,804
[45] Date of Patent: May 27, 1997

[54] PROCESS AND APPARATUS FOR SEPARATING CONSTITUENTS OF A GAS MIXTURE BY ADSORPTION

[75] Inventor: Fernande Schartz, Brussels, Belgium

[73] Assignee: Jacques Ribesse, Brussels, Belgium

[21] Appl. No.: 387,747

[22] PCT Filed: Aug. 18, 1993

[86] PCT No.: PCT/BE93/00053

§ 371 Date: Feb. 17, 1995

§ 102(e) Date: Feb. 17, 1995

[87] PCT Pub. No.: WO94/04249

PCT Pub. Date: Mar. 3, 1994

[30] Foreign Application Priority Data

Aug. 18, 1992 [LU] Luxembourg ............... 88160

[51] Int. Cl.⁶ ................................. B01D 53/047
[52] U.S. Cl. .................. 95/101; 95/102; 95/105; 95/130; 96/124; 96/130; 96/132; 96/144
[58] Field of Search ............ 95/95–98, 100–107, 95/113, 130; 96/122, 124, 130–133, 143, 144

[56] References Cited

U.S. PATENT DOCUMENTS

| | | | |
|---|---|---|---|
| 2,204,431 | 6/1940 | Moore et al. | 96/124 |
| 2,751,032 | 6/1956 | Ringo et al. | 96/124 |
| 2,759,560 | 8/1956 | Miller | 96/122 X |
| 2,799,363 | 7/1957 | Miller | 95/113 |
| 2,861,651 | 11/1958 | Miller | 95/113 |
| 3,201,921 | 8/1965 | Heyes | 95/113 X |
| 3,231,492 | 1/1966 | Stine et al. | 96/124 X |
| 3,504,483 | 4/1970 | Tamura et al. | 55/180 |
| 4,469,494 | 9/1984 | van Weenen | 96/124 |
| 4,612,022 | 9/1986 | Berry | 95/113 |
| 4,971,611 | 11/1990 | Noguchi | 96/124 X |
| 5,112,367 | 5/1992 | Hill | 96/124 X |
| 5,133,784 | 7/1992 | Boudet et al. | 95/100 |
| 5,169,414 | 12/1992 | Panzica et al. | 95/113 |
| 5,298,054 | 3/1994 | Malik | 95/104 X |

FOREIGN PATENT DOCUMENTS

| | | |
|---|---|---|
| 0512534 | 11/1992 | European Pat. Off. . |
| 1011378 | 6/1952 | France . |
| 76 15416 | 12/1976 | France . |
| 0393586 | 6/1933 | United Kingdom ......... 96/124 |
| 871242 | 6/1961 | United Kingdom . |
| 0942261 | 11/1963 | United Kingdom ......... 96/124 |
| 1150346 | 4/1969 | United Kingdom . |
| 1551732 | 8/1979 | United Kingdom . |
| 2033777 | 5/1980 | United Kingdom ......... 96/124 |
| 92/00793 | 1/1992 | WIPO . |

OTHER PUBLICATIONS

Separation and Purification Methods, Editors, Carel J. Van Oss, Eli Grushka, and Joseph D. Henry, Jr. vol. 14, 1985 No. 2, pp. 157, 160, 161, 198–207.

*Primary Examiner*—Robert Spitzer
*Attorney, Agent, or Firm*—Spencer & Frank

[57] ABSTRACT

A process for separating components of a gas by adsorption in an enclosure (1) divided into equal tight separated compartments (27) each provided with an adsorbent material (7, 8) chosen in function of the gas to be treated and each provided for temporarily allowing the gas to be treated to be introduced and at least one chosen component of the components of this gas to be evacuated whilst the other component or components of this gas are adsorbed by the material (7, 8), which process consists in introducing the gas to be treated into one of the compartments (27) until a predetermined pressure is reached while in the next compartments (27), gas to be treated is introduced in at least one compartment (27) and the chosen component is allowed to escape, the pressure in the next compartment (27) is allowed to drop so as to obtain a partial desorption of the non chosen component or components of the gas, a purging fluid is injected in the last compartment to achieve the final desorption, and device for carrying out the process.

9 Claims, 3 Drawing Sheets

PROCESS AND APPARATUS FOR SEPARATING CONSTITUENTS OF A GAS MIXTURE BY ADSORPTION

BACKGROUND OF THE INVENTION

1. Field of the Invention

The present invention relates to a process for separating components of a gas by adsorption in an enclosure divided into equal tight separated compartments each provided with an adsorbent material chosen in function of the gas to be treated and each arranged for temporarily allowing the gas to be treated to be introduced and at least one chosen component of the components of this gas to be evacuated whilst the other component or components of this gas are adsorbed by said material, which process consists in introducing the gas to be treated into one of the compartments until a predetermined pressure is reached while in the next compartments, consecutively starting from the one which is the nearest to said compartment where the gas is pressurized, the following operations are performed: gas to be treated is introduced in at least one compartment and said chosen component is allowed to escape therefrom, the pressure in the next compartment is allowed to drop so as to obtain naturally a partial desorption of the non chosen component or components of the gas, optionally this same compartment is subsequently, also in view of the partial desorption, subjected to a partial vacuum and a purging fluid is injected in the last compartment to achieve the final desorption of the material.

2. Description of the Related Art

Separation of gasses is carried out by the following known techniques:

cryogenics selective adsorption of components of the gas on an adsorbent, through alternate cycles in two or several reactors each operating successively in adsorptive and desorptive mode, by temperature change effect (T.S.A. =Temperature Swing Adsorption) (see patent GB-871, 242), or by pressure change (P.S.A. =Pressure Swing Adsorption).

The cryogenic technique is applied for large quantities of gas to be treated. In this case, high tech centralised installations are involved due to the extremely low temperatures to be reached in order to obtain the liquefaction required for separating the components of the gas to be treated.

The cryogenic technique shows the important drawbacks of many exchangers and devices working at very low temperatures (−100° to −190° C.) and consuming a lot of energy. This process type is expensive as to capital outlay in that, in order to obtain a sufficient efficiency, large centralised units have to be constructed in order to profit from the "scale effect" and the pure gas has to be delivered to the users by means of an extensive network of pipings, or by transporting this gas in liquid form, which requires specific very expensive means.

The known process of the P.S.A. type (see "Separation and Purification Methods", 14(2), 1985; Marcel Dekker Inc.; D. Tondeur, P. Wankat; Gas Purification by P.S.A.; pages 157, 160, 161) is based on the system shown in FIG. 1 and has been developed since 1970. This process and the means for carrying out this process are described hereinafter (see, for example, the UK patent 1,150,346 filed on Sep. 22, 1966).

This known P.S.A. process comprises (FIG. 1) two or more reactors A and B, filled with an adsorbent mass, a gas compressor 15 feeding reactor A with gas after being cooled in an exchanger 106 by opening a valve 101. The gas to be separated into its components (for example, air from which one wishes to extract oxygen) passes through reactor A, the adsorbent material being chosen for retaining preferentially one or more components of the air (for example, $H_2O$, $N_2$). The gas becomes progressively impoverished in these components until they are almost entirely eliminated. The chosen component (oxygen, for example) leaves reactor A via the valve 103 towards the utilization 108. In the chosen example, it is therefore a gas released from its moisture and from nitrogen, which comes out of reactor A, i.e., a gas consisting of oxygen and argon. The non-chosen components are adsorbed and accumulate in the adsorbent mass which is quickly saturated. It is therefore necessary to regenerate the adsorbent. In order to prevent interruption of the production during the regeneration, a second or further reactors working alternately or substantially simultaneously are required. When adsorbing the component to be extracted ($N_2$, for example) in reactor A, the same component adsorbed in the mass of reactor B is desorbed. To this end, reactor B, isolated from reactor A by closing the valves 111 and 113, is subjected to a pressure drop when opening a valve 112, the adsorbed gas being possibly extracted by a vacuum generated by the vacuum pump 6. The adsorbed gas is in this way progressively evacuated from the adsorbent mass by the pressure change effect. After a relatively short working period (1 to 3 minutes, for example), the adsorbent mass of reactor A is saturated while the adsorbent mass of reactor B is regenerated, and the gas circuits are reversed. Fresh gas is sent to reactor B and the desorption is performed in reactor A by reversing the valves 101,102,111, 112, 103, 113. Moreover, remaining gasses contained in the reactors are evacuated, by inverse sweeping of pure gas (oxygen, for example) by means of valves 104 and 114.

The known P.S.A. process described hereinabove, although it has been relatively recently developed, has the drawback of comprising a large number of valves working very frequently, i.e., 500,000 operations a year. This requires the use of high quality materials and an efficient maintenance service. The high number of reversing operations imposes a limited diameter of the valves and, consequently, a limited capacity of gas treatment. Additionally, the energy consumption, although less compared to the cryogenic technique, is still very important.

Other recent P.S.A. systems have been worked out. Patent application EP-A-0 512 534 filed on May 7, 1992 describes, for example, a P.S.A. system composed of a fixed or movable reactor, divided into compartments (2 to 8) and fed by one or two rotary horizontal flat valves rotating between fixed plates.

This last P.S.A. system has i.a. considerable drawbacks from the fact that it comprises one or two sliding surfaces (flat valves) disposed between fixed surfaces, which results in large leakages of gas and requires an expensive maintenance in order to prevent erosion and wear of these surfaces. Further, a considerable driving power is required for actuating these rotary devices. The energy consumption of this system is as high as the preceding P.S.A. processes.

SUMMARY OF THE INVENTION

An object of the present invention is to obviate the drawbacks of the techniques, processes and systems described hereinabove and to provide a process which is particularly economic, both as to capital outlay and in consumption, and which allows to use gas separation equipments of any sizes (from 50 to 20,000 $m^3/h$ oxygen production, for example) without using specific expensive materials (cryogenics) or devices with high wear intensity (valves).

To this end, for the separation process according to the invention, at least one additional compartment is provided between the compartment wherein the pressure is allowed to drop and the compartment wherein the purging fluid is injected, which additional compartment is subjected to a final desorption vacuum, if necessary stronger than the partial vacuum for the partial desorption, and the compartment wherein the purging fluid is injected is also subjected to substantially the same final desorption vacuum, and an additional compartment is provided between the compartment wherein the purging fluid is injected and which is subjected to a final desorption vacuum, and the compartment wherein the gas to be treated is introduced up to a predetermined pressure, in which additional compartment gas to be treated is let in naturally, by natural aspiration, compensating for the vacuum prevailing therein after the vacuum purging operation.

According to an advantageous embodiment of the invention, the different operations performed simultaneously in each of said compartments are arranged for having therein a substantially equal effective duration, in particular equal to the effective adsorption duration of the mass of adsorbent material in the compartment wherein said gas to be treated is introduced upto a predetermined pressure.

According to a preferred embodiment of the invention, the energy produced by said pressure drop causing naturally the partial desorption is recuperated. Moreover, the energy produced upon letting gas to be treated naturally into the purged compartment, which is under vacuum, can advantageously be recuperated.

According to a particularly preferred embodiment of the invention, the gas to be treated, on the one hand, and the purging fluid, on the other hand, circulate at a substantially constant speed in the adsorbent material, said material being disposed in each compartment such as to present at the inlet side of the gas to be treated a surface, transverse to the circulation direction, greater than the surface which the adsorbent material presents at the inlet side of the purging fluid, the intermediate transverse surfaces decreasing progressively from the inlet of the gas to be treated to the inlet of the purging fluid, the variation of the transverse surface corresponding, in a feed direction of the gas to be treated, to the variation of the volume of the gas to be treated as this gas looses adsorbed components and, in the opposite direction, to the variation of the volume of the purging fluid as this gas collects adsorbed components and increases in volume.

According to a particularly advantageous embodiment of the invention, the adsorption and/or desorption steps are subdivided into partial steps performed in compartments similar to the above mentioned compartments.

The invention also relates to an apparatus for carrying out above mentioned process.

According to the invention, this apparatus comprises similar compartments with double bottom, which are separated and tight and which each comprise at least a same adsorbent material lying on the upper bottom and which are each provided with two apertures made in a wall of the compartment and destined selectively for the passage of gas to be treated, of its components and of purging fluid, one of the apertures being disposed between the two bottoms and the other one at the level of the adsorbent material, a passage being provided in the upper bottom communicating with a space of the same compartment situated opposite the above mentioned apertures and delimited by a screen extending transversely to the upper bottom, a second screen being provided substantially parallel to the wall having the two above mentioned apertures and being disposed near this latter wall in the compartment, the adsorbent material being maintained between these two screens, said compartments being fixed and regularly divided around distribution means comprising a distribution cylinder arranged to be rotative around its axis so as to cooperate turn by turn with the above mentioned apertures of each of the compartments for allowing selectively the passage of the above mentioned gas to be treated, components and purging fluid, means being provided, on the one hand, for rotating the distribution cylinder either continuously or step by step and, on the other hand, for feeding the gas to be treated and the purging fluid to the distribution means, as well as for allowing the chosen component and the non-chosen component or components to be evacuated, sealing means being provided for selectively isolating the means for directing the gas to be treated, the purging fluid and the respective chosen and non chosen components through the distribution means and the compartments from one another.

According to a particular embodiment of the invention, the distribution cylinder is divided into a number of longitudinal channels provided for the passage of the pressurized gas to be treated, of the component to be decompressed, of the desorbed components towards the vacuum pump, of the purging fluid towards the vacuum pump, and of the naturally let in gas to be treated, and in that it is provided with apertures putting these channels selectively in communication, on the one hand, with the appropriate compartments of the enclosure and, on the other hand, with fixed outer pipings for the pressurized gas to be treated, the non-chosen component or components to be discharged to the outside towards an optional recuperation turbine, the non-chosen components to be discharged to one or more vacuum pumps, and for gas to be treated under atmospheric pressure, optionally through a recuperation turbine.

Other details and particularities of the invention will become apparent from the description of the drawings which are annexed to the present text and which illustrate, by way of non-limitative examples, the process and a particular embodiment of the device according to the invention.

BRIEF DESCRIPTION OF THE DRAWINGS

In the different figures, the same reference numerals relate to identical or analogous elements.

Figure 1:
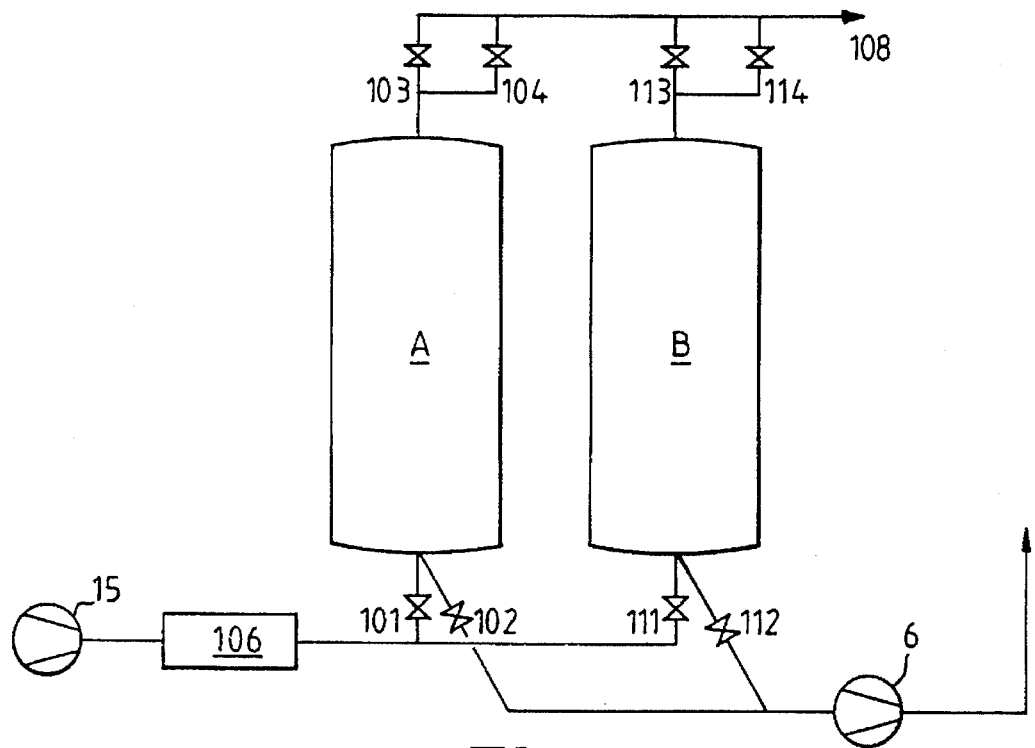
FIG. 1 shows schematically the prior art system for carrying out the P.S.A. process as set forth hereinabove.

The process and the device for carrying it out according to the invention are i.a. characterised by the continuity of operation, by the absence of means for opening and closing the gas passages comprising maintenance requiring members, such as the usual valves, and by the possibility to make units of any size (50 to 20,000 m³/h of oxygen, for example), leading always to smaller production costs.

The process and the device for carrying it out according to the invention can be used in a lot of applications indicated hereinafter in a non-limited way:

production of industrial or medical oxygen or air further nitrogen starting from ambient air (depending on the nature of the adsorbent), separation of carbon dioxide gas from natural gas, production of pure hydrogen starting from hydrogen containing gas.

The gas separating process according to the invention, explained hereinafter in further detail, is based on the preferential adsorption of components of the gas onto an adsorbent and it operates by periodically changing the pressure in order to obtain the different required phases, i.e.,:

pressurizing, adsorption and emission of pure gas, decompression and partial desorption, preferably with energy recuperation, putting under vacuum and final desorption, recuperation of the vacuum, optionally with energy recuperation.

DESCRIPTION OF THE PREFERRED EMBODIMENTS

According to the invention, apparatus 100 for carrying out the process of the invention is formed by a closed fixed cylindrical or polygonal casing 1 which is the enclosure 1 of the adsorption reactor comprising an inner cylindrical duct 2 provided with gas passage apertures 3 and 4 (preferably one of each per compartment).

A rotary tubular distributor or distributor cylinder 5 feeds the enclosure 1 with crude gas and permits evacuation of the desorbed gas which is being decompressed by depression and possibly by vacuum achieved by means of vacuum pump 6, 66.

Figure 3:
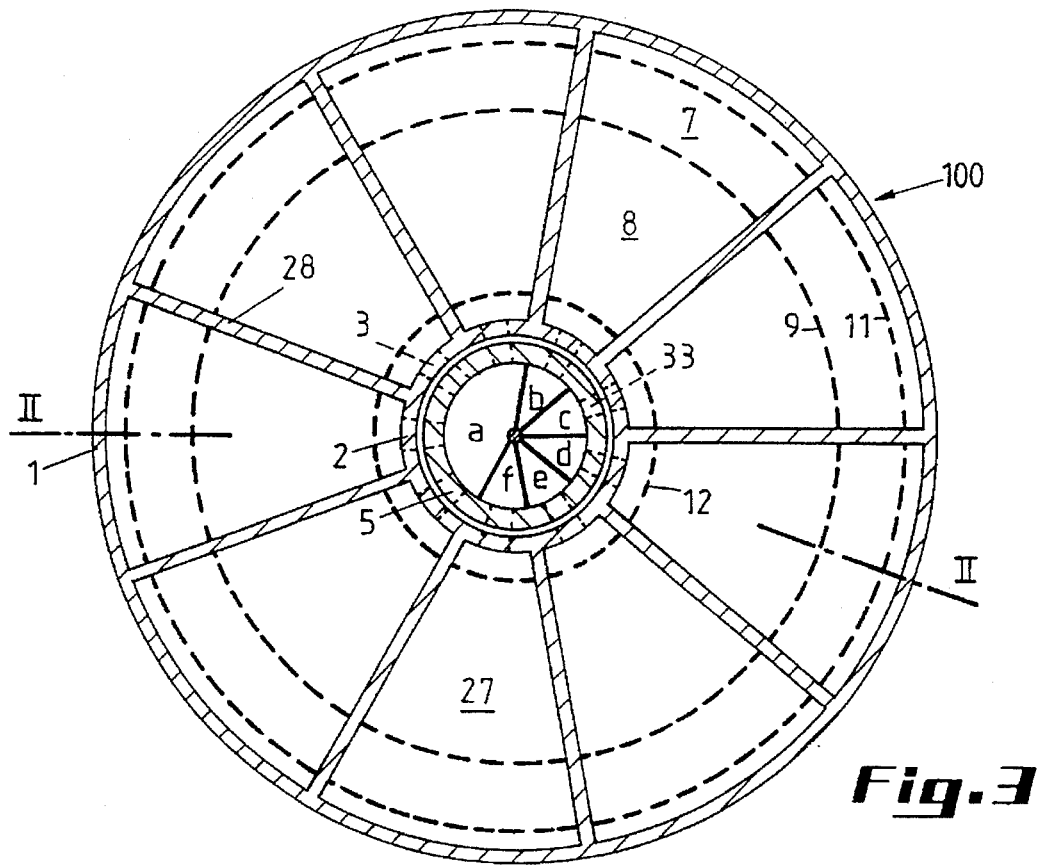
FIG. 3 shows a cross section of said device in the area of line III—III of FIG. 2.

The enclosure is divided into compartments 27 having in cross section the shape of circle or polygon sectors 27, shown in FIG. 3 and separated from one another by vertical tight walls 28.

Each compartment 27 is filled with at least one adsorbent material adapted to the nature of the gas to be extracted: a desiccant 7 and/or a zeolite 8, for example, or still other specific adsorptive masses. Different adsorbent materials 7, 8 are preferably separated by one or more screens 9.

Each compartment 27 is provided with a wall or cylindrical duct 2, with a crude gas inlet aperture 3, which aperture 3 is also destined to evacuate the gas desorbing from the mass by the effect of a pressure drop. A sheet 10 fixed to the same wall 2 within the enclosure 1 forms with the bottom 99 of the enclosure a double bottom and permits to direct the passage of the entering crude gas (arrow 98) or the leaving desorbed gas (arrow 97) of the compartments 27 towards, or coming from the inner circumference of the enclosure 1, so as to ensure a radial flow of the gasses not only between this double bottom 10 and 99 but especially through the mass or masses 7, 8 (arrow 96 during absorption and arrow 95 during desorption).

Onto this sheet 10, screens 11, 9, 12 are fixed for peripheral gas distribution and for retaining the adsorbent masses 7, 8 without mixing them.

A first adsorbent mass destined for adsorbing a first set of gas components, a desiccant, for example, is represented by 7 and is placed between the screens 11 and 9.

A second adsorbent material destined for adsorbing specifically a second component of the gas is shown in 8 (special zeolite or activated carbon, for example) and is placed between the screens 9 and 12. At least a third type of specific adsorbent mass can also be provided for extracting a third component of the gas, which is not shown in the figures.

The same wall 2 of the enclosure 1 is provided with evacuation apertures 4 for the purified gas, or chosen component, which apertures are applied into the inner cylinder 2. Opening and closing of these apertures is controlled by the rotary distributor 5.

The rotary distributor 5 is destined for transferring the gasses to the appropriate different compartments 27, i.e., the crude gas, the desorbed gasses extracted from the adsorbent masses 7, 8, or the purified gas. This distributor is also a transfer means for the different gasses coming from or going to the external connections, for example, a crude gas blower 15, energy recuperation turbines 16A, 16B, one or more vacuum pumps 6, 66.

The rotary distributor 5 is provided with apertures 33, 44 destined for flow of gasses situated within the enclosure 1 and others situated outside the enclosure 1 for the external flow of gasses (see FIG. 2 and FIGS. 4 to 11)).

The rotary distributor 5 is also provided with gas flow channels a, b, c, d, e, f, (FIGS. 3 and 4 to 11) arranged along the axis of the distributor 5 and ensuring a selective passage of the gasses towards their destination.

In order to ensure the tightness of the system, the rotary cylindrical distributor 5 is provided with O rings 13 and sealing segments 14 shown in FIGS. 2 and 12 to 14. Gas leakages are in this way avoided both in the enclosure 1 and in the outer part of the above distribution means connected to the outside, and this notwithstanding the existing clearance between the fixed inner cylinder 2 and the rotary distributor 5.

The rotary distributor 5 is driven to rotate, at an adjustable speed, for example of between 0.2 and 5 rpm, by means of an electric or pneumatic motor 23 according to a continuous or sequential (step by step) rotation mode.

The above described system can be simplified by reducing the number of compartments, i.e., 9 compartments indicated in FIG. 3, by omitting energy recuperation machines 16, vacuum pumps 6, 66 and by simplifying the arrangements provided on the rotary distributor 5 accordingly. This results in a reduction of the number of apertures, channels and seals. Consequently, a less expensive equipment is obtained having, however, an increased energy consumption, i.a. by the absence of energy recuperation.

In order to reduce the energy consumption, the blower 15 can be driven for example, by an electric motor 80, to the shaft of which is also coupled the energy recuperation turbine 16A.

Moreover, the vacuum pumps 6, 66 are driven, for example, by an electric motor 81, to the shaft of which the energy recuperation turbine 16B can be coupled.

Working of the process and device according to the invention

Figure 6:
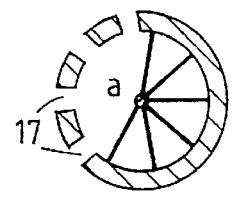
Figure 7:
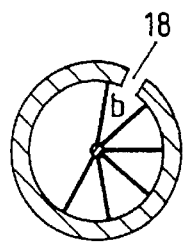
Figure 8:
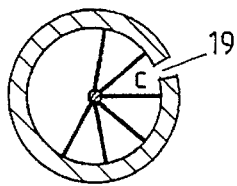
Figure 9:
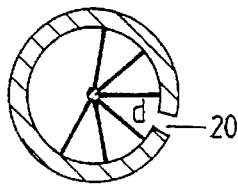
Figure 10:
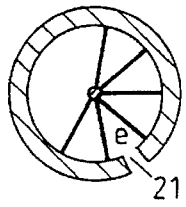

The crude gas (for example, air) is supplied under pressure at ambient temperature, from the blower 15 towards reactor or enclosure 1 where it enters the rotary distributor 5 through the apertures 17 (FIG. 2) and the inner channel a (FIG. 3 and FIG. 6).

Figure 2:
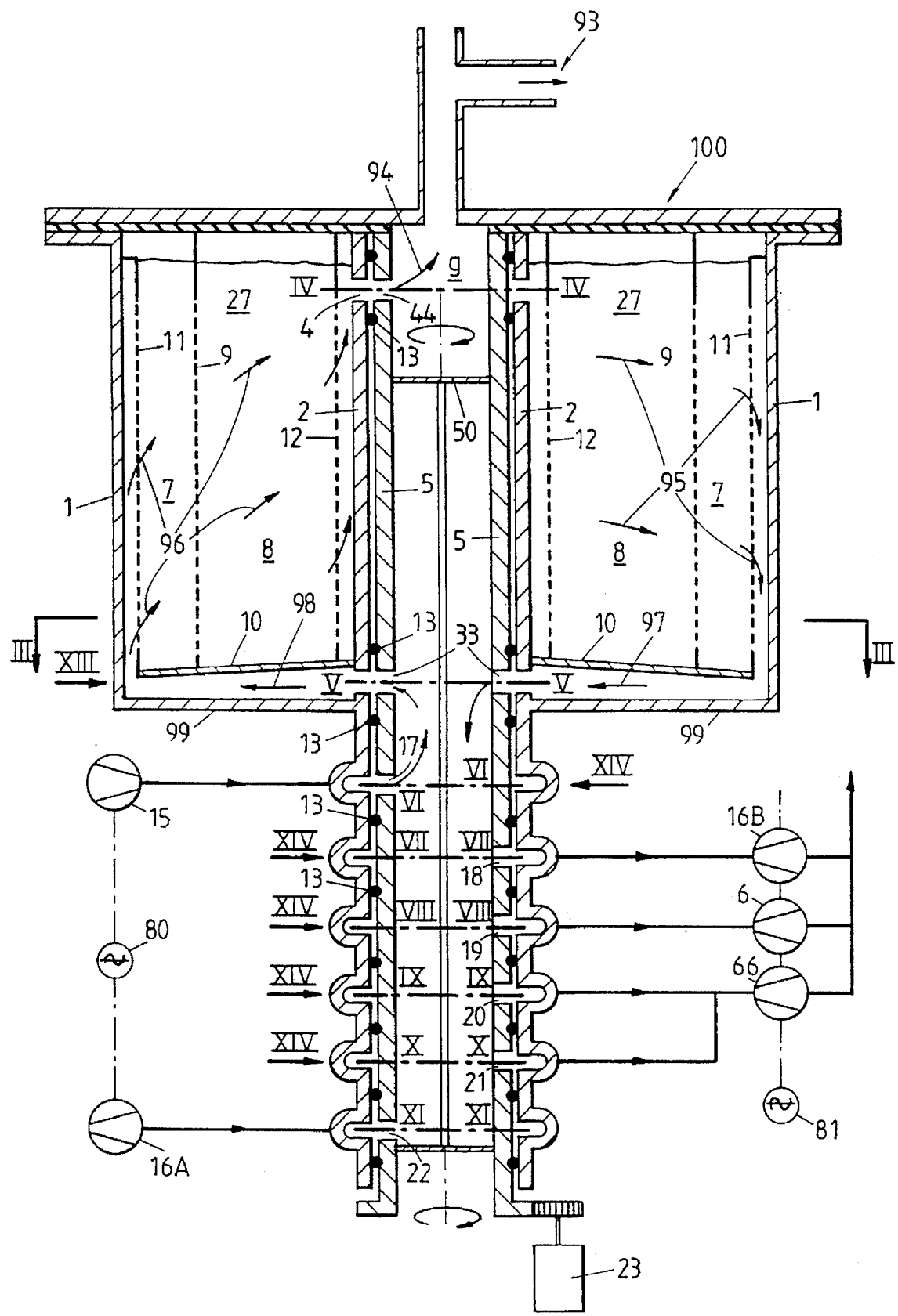
FIG. 2 is a schematic elevational representation in axial section, according to line II—II of FIG. 3, of a device according to the invention for carrying out the process according to the invention.
Figure 4:
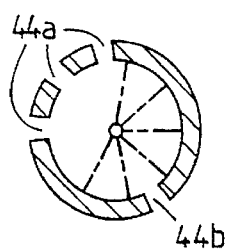
FIGS. 4 to 11 each show a cross section of said device in the area of the respective lines IV—IV to XI—XI of FIG. 2.
Figure 5:
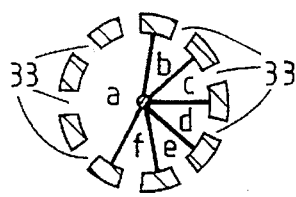

The crude gas is distributed in a certain number of compartments 27, for example, four, thanks to the apertures provided in the distributor 5 (apertures 33 in FIGS. 2 and 5).

The crude gas is directed, within the compartments 27 which are in the adsorption phase, towards the periphery of reactor 1 thanks to the plate 10 (FIG. 2). The gas is distributed in a first adsorbent mass 7, (desiccant, for example) radially from the outside towards the inside of the reactor (arrows 96) by means of a screen 11 and the gas is released from a first component (humidity, for example) after which it passes through a special adsorbent mass 8 (zeolite or activated carbon), when flowing towards the axis of reactor 1.

The different adsorbent masses indicated hereinabove are separated by a screen 9. The crude gas is thus released by adsorption from the component of the gas which is to be eliminated (for example, nitrogen in the case of oxygen production).

The gas purified in this way (oxygen, for example) is collected in the central part of reactor 1 between the screen 12 and the fixed inner cylinder 2. It is directed towards the other end of the reactor, for example, towards the top, through the uncovered apertures 4 and 44 of the rotary distributor 5 (see section of FIG. 4) situated on the right hand side of channel a (FIG. 3) but opening into a channel g leading to the outlet of the enclosure 1, according to arrow 94 (channel g being separated from the other channels by a radial tight partition 50).

The pure gas is in this way evacuated towards the outside of the enclosure 1 (in 93) and transferred to the utilization. It is to be noted that at the moment four compartments 27 are connected at the same time to channel a for pressurizing them with gas to be treated (apertures 17, FIG. 6), only three of these compartments 27 are connected to the channel g (apertures 44a, FIG. 4), the remaining compartment 27 being first of all pressurized without the possibility for the gas or the chosen component to escape.

Multiple function of the rotary distributor 5

Simultaneously with the injection of crude gas into a predetermined number of compartments 27 (four, for example) via channel a (FIGS. 3 to 11), the adjoining compartments 27 are decompressed through successive steps. For example, a compartment 27 is decompressed to atmospheric pressure by channel b, FIGS. 3 and 7 (aperture 18). A next compartment 27 is put under a partial vacuum through channel c (aperture 19, FIG. 8). A next compartment 27 is put under a final vacuum through channel d, FIGS. 3 and 9 (aperture 20). Furthermore, a next compartment 27 is maintained under vacuum and swept by a flow of gas or pure chosen component in order to eliminate any trace of absorbed gas, via channel e, FIGS. 3 and 10 (aperture 21).

The gasses desorbed in this way are discharged back into the atmosphere in the distributor 5, through different apertures 18, 19, 20, 21 FIG. 2 and FIGS. 4 to 11 and through the energy recuperation machines 16 (A and B) or the vacuum pumps 6, 66.

Figure 11:
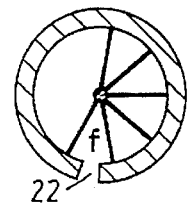
Figure 12:
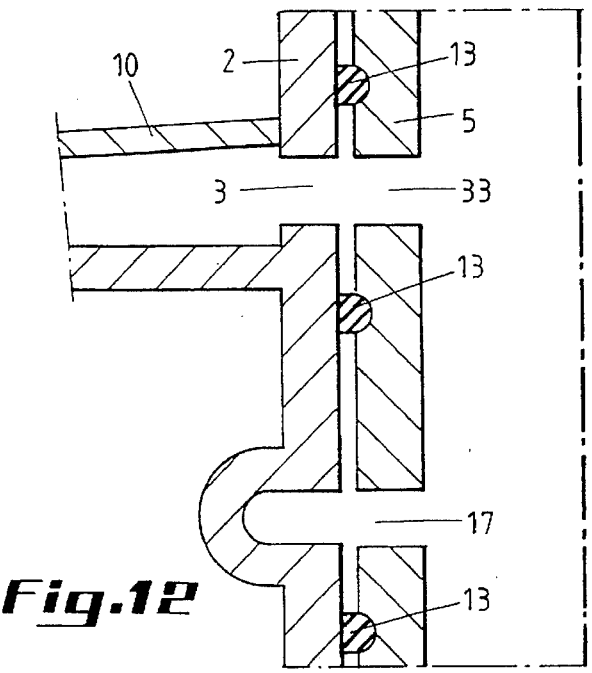
FIG. 12 shows in elevational section, with breaks, an enlarged detail of FIG. 2, for clarifying an arrangement of O sealing rings.
Figure 13:
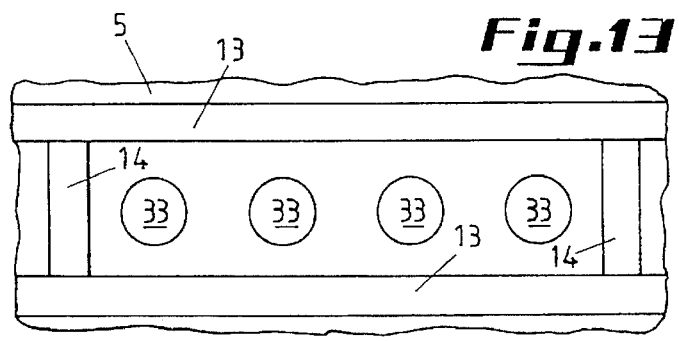
FIGS. 13 and 14 each show an elevational expansion, with breaks, of an enlarged detail of FIG. 2, seen according to the respective arrows XIII or XIV, onto the circumference of the distribution cylinder.
Figure 14:
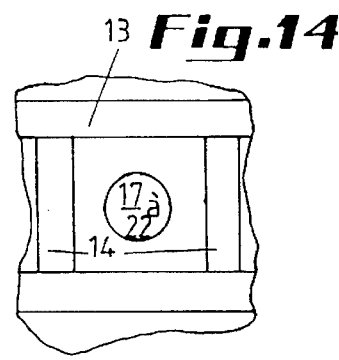

Finally, a last compartment 27, previously subjected to a vacuum, can be filled naturally with crude atmospheric gas via channel f (FIG. 3) and aperture 22 (FIGS. 2 and 11). This circuit can be provided with an energy recuperation turbine 16A actuated by the natural flow of this gas.

The central rotary distributor 5 permits each compartment 27 thus to perform separately and successively each of the operations required by the process, namely, introduction of non-compressed crude gas (aperture 22, channel f) with energy recuperation from the flow filling the vacuum prevailing in the corresponding compartment 27, compression (through the apertures 17, channel a), adsorption of gas and production of pure gas (escaping through apertures 44, channel g), partial decompression and recuperation of the energy of the gas absorbed under pressure (via aperture 18, channel b), progressive decompression in one or two steps (via apertures 19 and 20 and the respective channels c and d) and total desorption through the intermediary of vacuum pumps 6, 66, vacuum purging by means of pure gas (apertures 44b and 21, respective channels g and e, in the direction from g towards e).

As already said, the rotational speed of the rotary distributor 5 is adjustable from 0.2 to 5 rpm, either according to a continuous rhythm, or step by step and allows optimization of the process by its gas production capacity, by the quality of the pure gas, by the quantity of adsorbent mass, etc.

The adsorption period of a compartment 27 is short: 10 seconds to 1 minute. After this time, after the distributor 5 has performed a rotation, the introduction of crude gas and the evacuation of pure gas are interrupted by closing off the apertures 3 in communication with sector a of distributor 5 (FIG. 3) and the aperture 4. The compartment is then decompressed via channel b (FIG. 3) of the distributor 5 and partial desorption occurs, the gas being evacuated to the atmosphere via aperture 18 (FIG. 2), possibly through an energy recuperation turbine 16B (FIG. 2).

After a partial decompression period corresponding to the rotation of the distributor 5, a vacuum is generated in one or two steps via the apertures 3, channels c, d, of the distributor 5 (FIG. 3), the apertures 19, 20 (FIG. 2) and the vacuum pumps 6 and 66.

In this operation, all of the adsorbed gas (nitrogen, for example) is progressively eliminated by a progressive decrease of the pressure in the corresponding compartment 27.

Optionally, the adsorbed gas is subsequently totally eliminated by purging by means of pure gas by injecting this gas via the aperture 4 (FIG. 2) and the calibrated purge aperture 44b of the distributor 5 (FIGS. 2 and 4), the compartment 27 which is being purged, its aperture 3 (FIG. 2), the channel e of the distributor (FIG. 3), the aperture 21 (FIGS. 2 and 10), the vacuum pump 66.

In order to minimize the energy consumption required for generating the vacuum, an expansion turbine 16 (FIG. 2) which recuperates the decompression energy can be installed and the vacuum level can be subdivided into two or more circuits and vacuum pumps 6, 66 (FIG. 2).

When the operation of putting under vacuum and the purging operation are finished, the vacuum energy is recuperated by letting in crude gas (atmospheric air, for example) via aperture 22 of the rotary distributor 5, channel f (FIGS. 3 and 11) and aperture 3. This operation saves a quantity of crude gas which would otherwise have to be compressed.

It has to be noted that both the production of pure gas and the entirety of the external flows are continuous.

Advantages of the process and the device according to the invention

The flows of gasses passing through the adsorbent masses 7, 8 are progressively decreased as the adsorption reaction progresses, for example: 10 m$^3$ of crude air at the inlet, 1 m$^3$ pure oxygen at the outlet.

The proposed process and technique allows working with a substantially constant gas speed in the mass, thanks to the radial flow path and the progressively reduced flow section of the compartment 27 which has, in cross section, the geometric shape of a circle sector. This permits optimizing the efficiency of the adsorbent mass (a minimum of mass) 7, 8.

For carrying out the process according to the invention, the device may comprise only one enclosure 1 of a simple construction; furthermore, it does not comprise equipment of frequently used and wear sensitive apparatuses (this in contrast with the valves of the hereinabove described known PSA units).

The process works continuously according to the rotation of the distributor 5.

The process according to the invention and its technical implementation have characteristics permitting to manufacture gas separators of any capacity, for example from 50 to 20,000 m³/h. One device may be able to work in a flow rate range from 1 to 6 by adjusting the rotational speed of the distributor 5.

The energy consumption of a gas separator according to the invention (supply of the gas compressors, vacuum pump ...) is considerably reduced with respect to the consumption of the hereinabove mentioned known separation units.

The following table gives an example for the production of oxygen.

| Technique | Cryogenics | | P.S.A. | | According to |
|---|---|---|---|---|---|
| | liquid | gas | System | | the invention |
| Capacity ton/day | 500 | 1,000 | 10 | 10 | 100 |
| Consumption KWh/ton | 1,000 | 450 | 400 | 300 | 200 |

It has to be clear that the present invention is in no way limited to the embodiments described hereinabove, and that a lot of modifications could be applied thereto, without departing from the scope of the present invention.

I claim:

1. A process for separating a gas mixture composed of a plurality of gaseous constituents into separate gaseous constituents by adsorption within an enclosure, the enclosure having defined therein a plurality of compartments which are equal in size, sequentially arranged, separated from one another, and gas tight, which are each provided with an adsorbent material preselected as a function of which of the plurality of gaseous constituents is to be separated, and which are each arranged for temporarily allowing introduction of a gas mixture to be separated and for evacuation of at least one preselected gaseous constituent of the gas mixture whilst the adsorbent material adsorbs at least one not preselected gaseous constituent of the gas mixture to be separated, the process comprising:

a. as adsorption steps:
      (1) introducing the gas mixture to be separated into one of the plurality of compartments until a predetermined pressure is reached while in further compartments of the plurality of compartments, consecutively starting from a compartment which is closest to the compartment where the gas is introduced in step a. (1); and
      (2) introducing the gas mixture to be separated into at least one compartment and allowing the at least one preselected constituent to escape therefrom;

b. as desorption steps:
      (1) allowing pressure in a next compartment to drop so as to obtain naturally a partial desorption of the at least one not preselected gaseous constituent and optionally subsequently subjecting the next compartment, in view of said partial desorption, to a partial vacuum;
      (2) subjecting at least a next additional compartment to a final desorption vacuum which is equal to or stronger than the partial vacuum for the partial desorption; and
      (3) injecting a purging fluid into a last compartment to achieve a final desorption of the at least one not preselected constituent and substantially maintaining the final desorption vacuum therein during injection of the purging fluid; and c. providing between the compartment of step b (3) into which the purging fluid is injected and which is subjected to the final desorption vacuum, and the compartment of step a (1) wherein the gas mixture to be separated is introduced up to a predetermined pressure, an additional compartment wherein the gas mixture to be separated is let in naturally, by natural aspiration, whereby the vacuum prevailing therein after vacuum purging in step b (3) is compensated.

2. The process as claimed in claim 1, wherein the adsorbent material of the compartment of step a(1) in which the gas mixture to be separated is introduced up to a predetermined pressure has an effective adsorption duration, and wherein the different steps are performed simultaneously in each of the plurality of compartments for a substantially equal effective duration which is equal to the effective adsorption duration in the compartment of step a (1).

3. The process as claimed in claim 1, further comprising recuperating energy produced by the pressure drop in step b (1) to obtain naturally a partial desorption of the at least one not preselected constituent.

4. The process as claimed in claim 1, further comprising recuperating energy produced upon letting gas mixture to be separated naturally into the vacuum purged compartment of step b (3).

5. The process as claimed in claim 1,
   wherein the gas mixture to be separated has a circulation direction and a feed direction,
   wherein the adsorbent material has a surface at an inlet side of the gas mixture to be separated which is transverse to the circulation direction and a surface at an inlet side of the purging fluid,
   wherein the gas mixture to be separated and the purging fluid both circulate at respective substantially constant speeds in the adsorbent material, the adsorbent material being disposed in each compartment so that the surface presented at the inlet side of the gas mixture to be separated is greater than the surface presented at the inlet side of the purging fluid, and
   wherein optional intermediate transverse surfaces decrease progressively from the inlet of the gas mixture to be separated to the inlet of the purging fluid, the transverse surfaces varying, in the feed direction of the gas mixture to be separated, according to variation of the volume of the gas mixture to be separated as the gas mixture looses constituents through adsorption and, in a direction opposite to the feed direction, to variation of the volume of the purging fluid as the gas collects adsorbed constituents and increases in volume.

6. The process as claimed in claim 1, wherein at least one of the adsorption and the desorption steps are subdivided into partial steps performed in compartments similar to said compartments.

7. An apparatus for carrying out the process as claimed in claim 1, comprising:
   a plurality of compartments which each have a double bottom including an upper section and a lower section, which are equal in size, sequentially arranged, separated from one another, and gas tight, which each contain at least a same adsorbent material disposed on the upper section, which are each provided with two apertures defined in a wall of the compartment which selectively allow passage of a gas selected from the group consisting of a gas mixture to be separated, at least one constituent of the gas mixture, and purging fluid, which are each provided with first and second screens between which the adsorbent material is maintained, the first screen extending transversely to the upper section and the second screen extending transversely to the upper section and being provided substantially parallel to and disposed near the wall having the two apertures defined therein, which each have a space positioned opposite the two apertures and delimited by the first screen, and which each have a passage provided in respective upper sections which communicates with the space, one of the two apertures in each compartment being disposed between the upper section and the lower section of the double bottom, and another one of the two apertures in each compartment being positioned under and near the top level of the adsorbent material and in communication with the space between the second screen and the wall in which the two apertures are defined; and distribution means comprised of a distribution cylinder arranged to be rotatable around its axis, the plurality of compartments being positioned and regularly divided around the distribution means so that the distribution cylinder cooperates as it rotates about its axis turn by turn with the respective two apertures of each of the plurality of compartments for allowing selectively passage of gas;

means for rotating the distribution cylinder either continuously or step by step;

means for feeding the gas mixture to be separated and the purging fluid to the distribution means;

means for allowing the at least one preselected constituent and the constituents other than the at least one preselected constituent to be evacuated; and sealing means for selectively isolating the means for feeding, the means for allowing, and the plurality of compartments from one another.

8. The apparatus as claimed in claim 7, wherein the distribution cylinder is divided into a plurality of longitudinal channels provided for allowing passage of one of pressurized gas mixture to be separated, constituent to be decompressed, desorbed constituent towards a vacuum pump, purging fluid towards the vacuum pump, and naturally let in gas mixture to be separated, each channel being separated from the next one by a longitudinal wall disposed radially in the distribution cylinder, from the rotating axis thereof to the distribution cylinder, and each channel being closed at its two longitudinal extremities, and wherein the distribution cylinder is provided with apertures which put the plurality of longitudinal channels selectively in communication with one of preselected compartments by means of the respective two apertures and fixed outer pipings disposed respectively at preselected levels along the rotating axis and provided respectively for the pressurized gas mixture to be separated, for constituents of the gas mixture other than at least one preselected constituent to be separated to be discharged to the outside towards an optional recuperation turbine, for constituents of the gas mixture other than at least one preselected constituent to be discharged to one or more vacuum pumps, and for gas mixture to be separated supplied under atmospheric pressure, optionally through a recuperation turbine.

9. An apparatus as claimed in claim 7, wherein the distribution cylinder has a length which is divided internally in two by a radial gas tight partition disposed between the levels of the two apertures of each compartment, a channel (g) being formed thereby for the at least one preselected constituent and being adapted to cooperate with the aperture under and near the top level of the adsorbent material of each compartment.

* * * * *